(No Model.) 5 Sheets—Sheet 1.

J. EDWARDS & J. R. F. KELLY.
CENTRIFUGAL PUMP.

No. 427,060. Patented May 6, 1890.

WITNESSES:
Gustave Dieterich.
William Goebel.

INVENTOR
Joseph Edwards
James R. F. Kelly.
BY
Frank G. Johnson
ATTORNEY.

(No Model.) 5 Sheets—Sheet 3.

J. EDWARDS & J. R. F. KELLY.
CENTRIFUGAL PUMP.

No. 427,060. Patented May 6, 1890.

WITNESSES:
Gustave Dieterich.
William Goebel.

INVENTOR
Joseph Edwards
James R. F. Kelly.
BY
Frank G. Johnson
ATTORNEY.

(No Model.) 5 Sheets—Sheet 4.
J. EDWARDS & J. R. F. KELLY.
CENTRIFUGAL PUMP.
No. 427,060. Patented May 6, 1890.
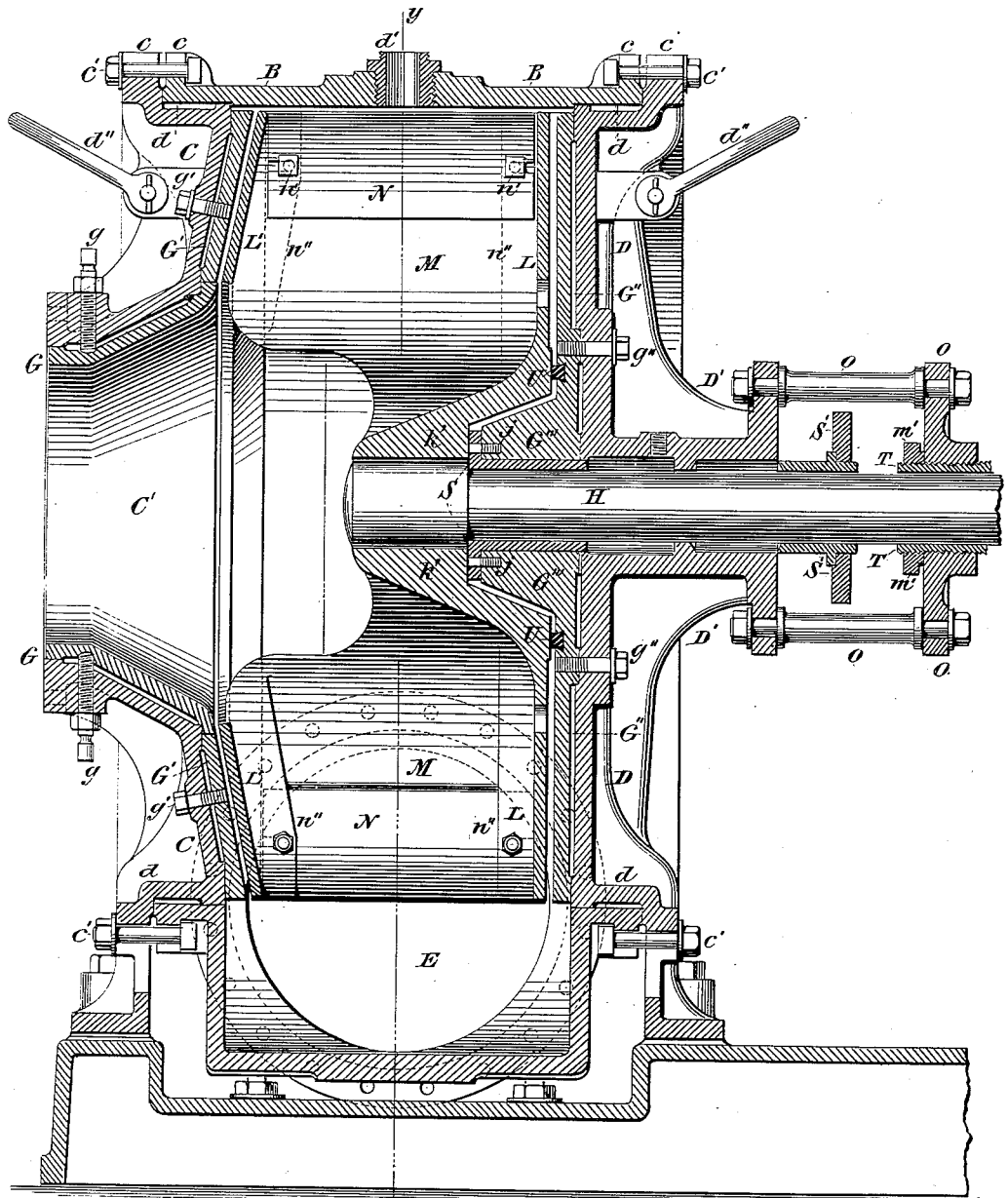

(No Model.) 5 Sheets—Sheet 5.

J. EDWARDS & J. R. F. KELLY.
CENTRIFUGAL PUMP.

No. 427,060. Patented May 6, 1890.

WITNESSES:
Gustave Dieterich.
William Goebel.

INVENTOR
Joseph Edwards
James R. F. Kelly
BY Frank G. Johnson
ATTORNEY.

UNITED STATES PATENT OFFICE.

JOSEPH EDWARDS AND JAMES R. F. KELLY, OF BROOKLYN, NEW YORK.

CENTRIFUGAL PUMP.

SPECIFICATION forming part of Letters Patent No. 427,060, dated May 6, 1890.

Application filed February 6, 1890. Serial No. 333,620½. (No model.)

*To all whom it may concern:*

Be it known that we, JOSEPH EDWARDS and JAMES R. F. KELLY, citizens of the United States, residing in the city of Brooklyn, in the county of Kings and State of New York, have invented certain new and useful Improvements in Centrifugal Pumps, of which the following is a specification.

The nature and object of our improvements relate to the economical construction of centrifugal pumps, to cheap and handy methods of repairing the same, to convenient adjustment and renewal of various portions thereof, to the prevention of rapid wear of their more costly parts, and to better adapt such pumps to the handling of mud, sand, gravel, coal, and other coarse and more or less solid material, as herein more fully set forth, reference being had to the accompanying drawings, consisting of five sheets, making a part of this specification, in which—

Figure 1:
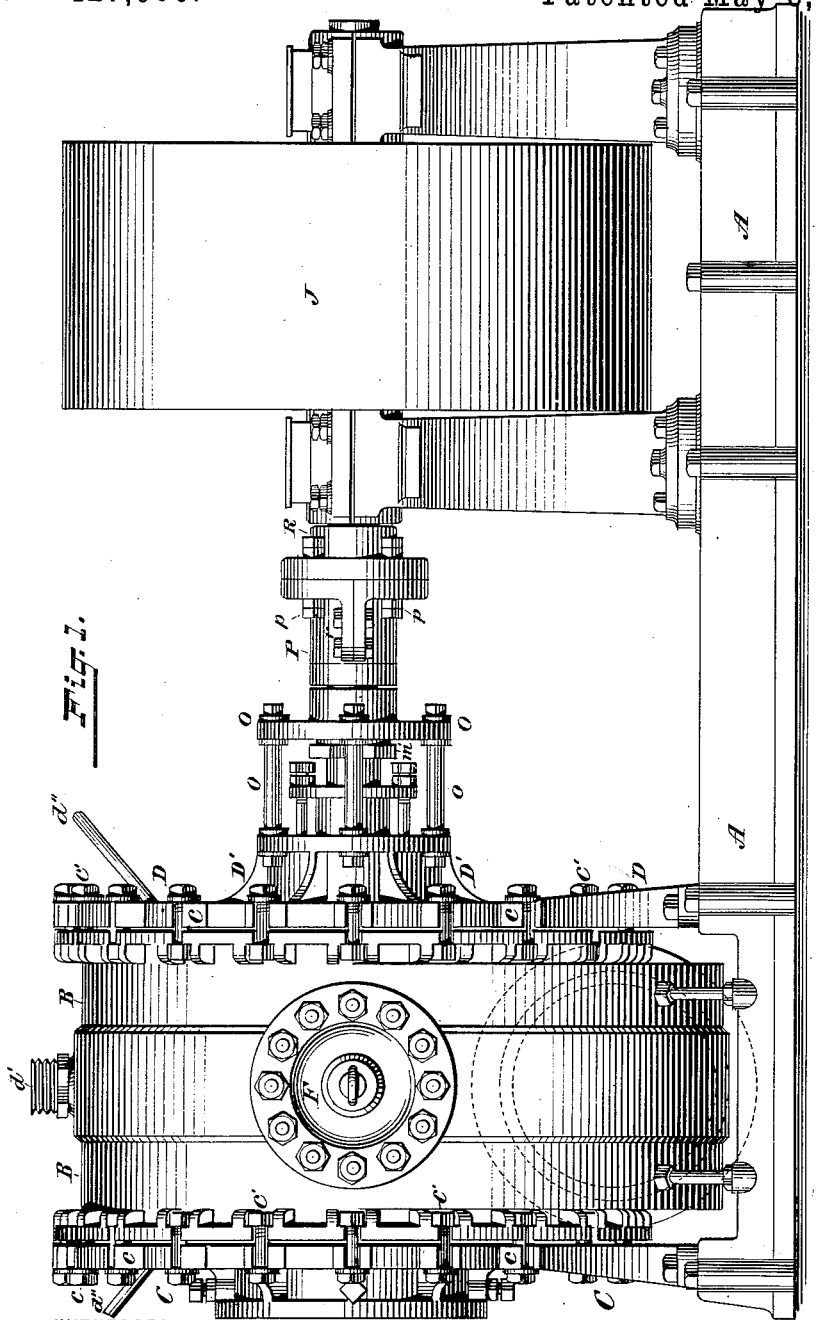
Figure 2:
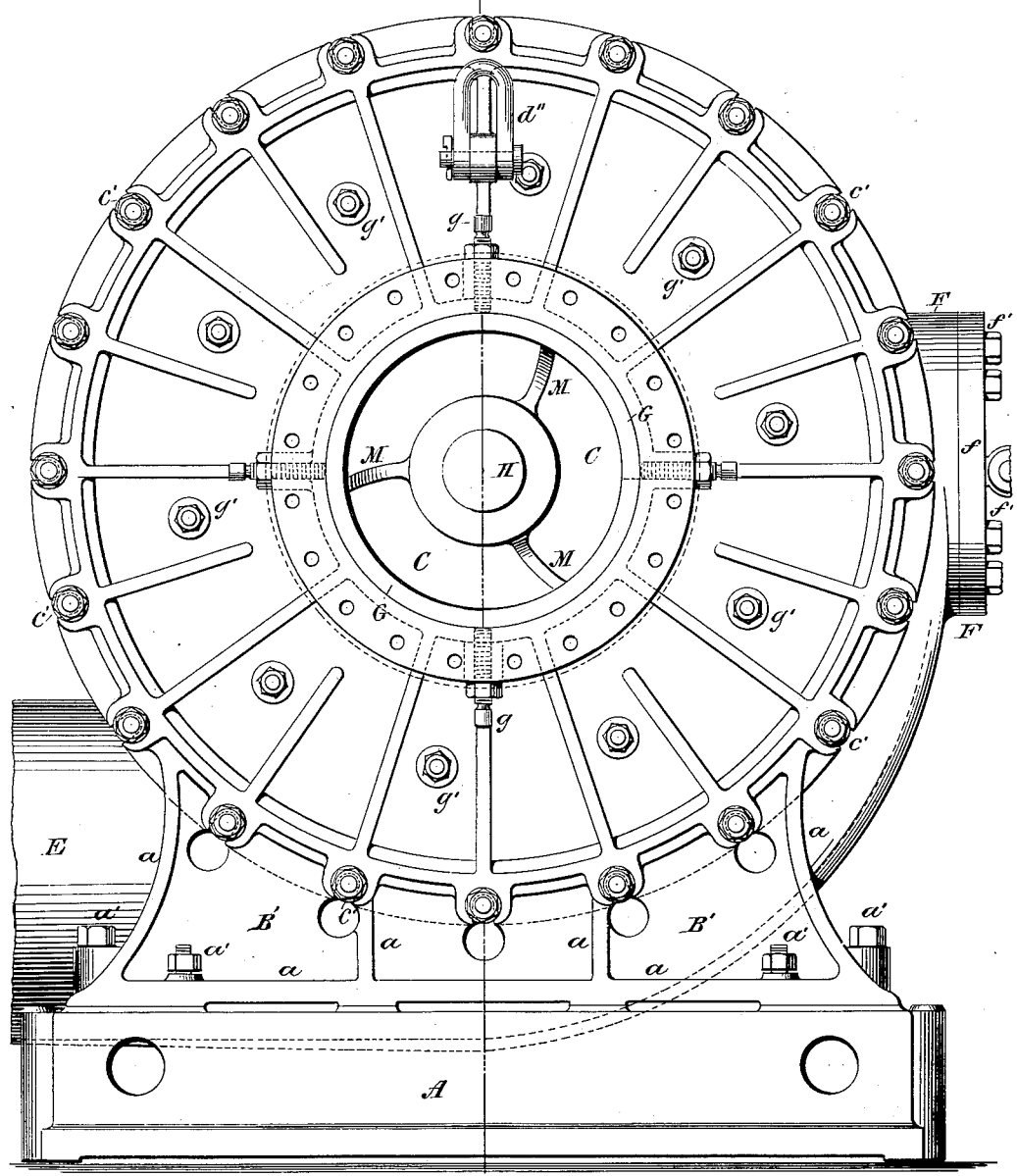
Figure 3:
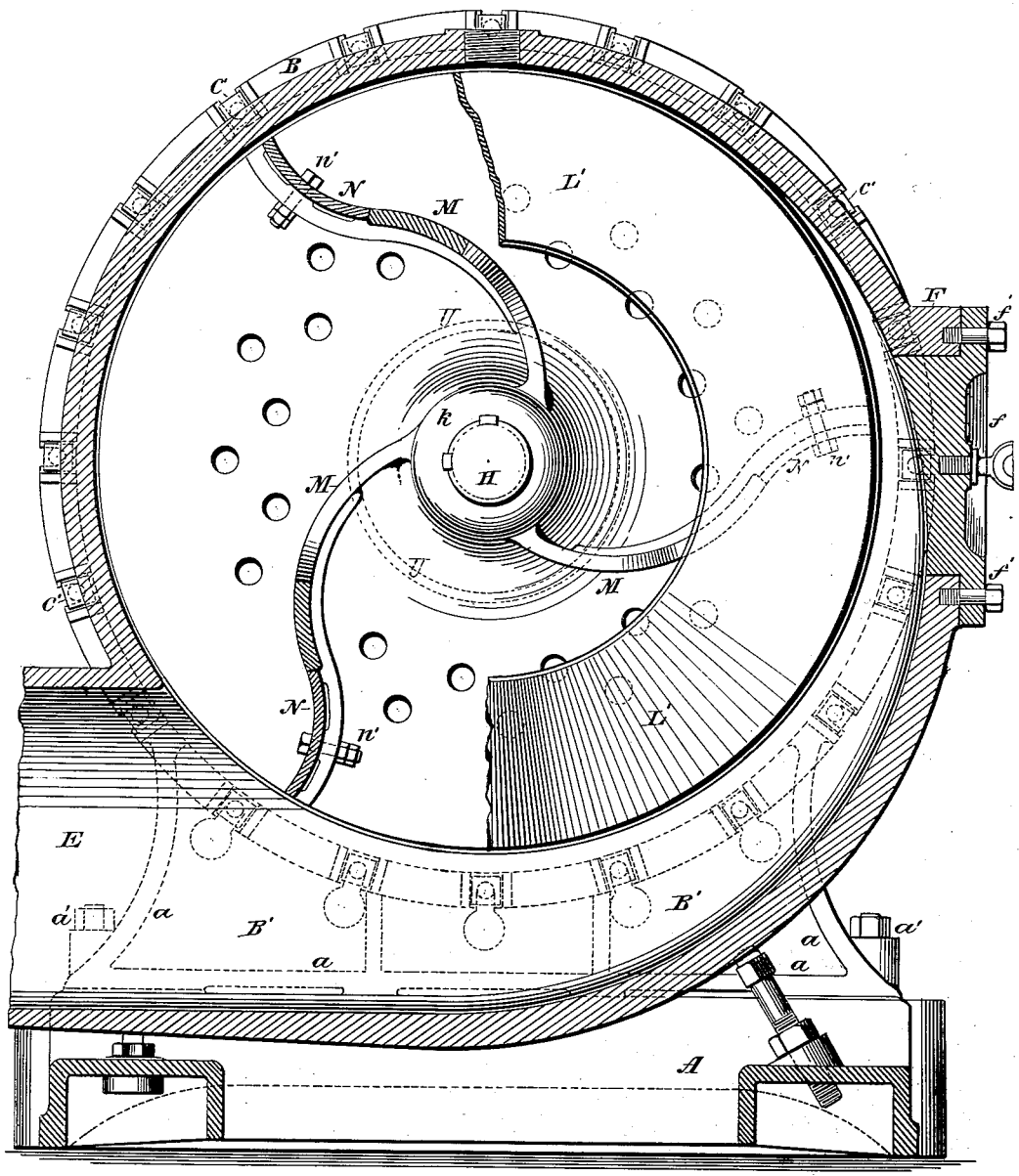
Figure 6:
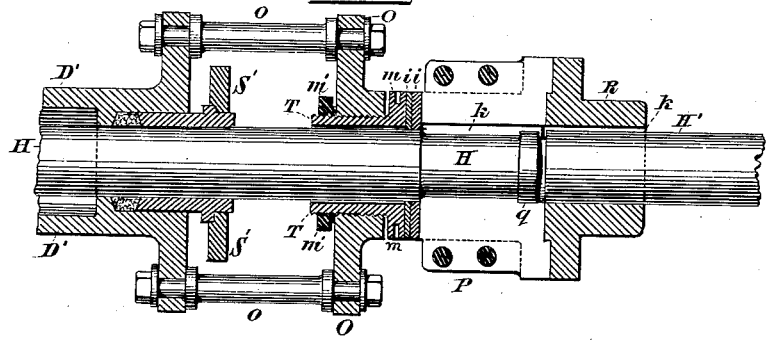
Figure 7:
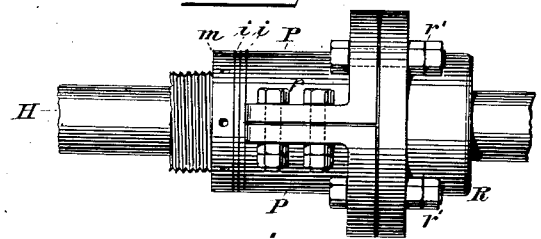
Figure 8:
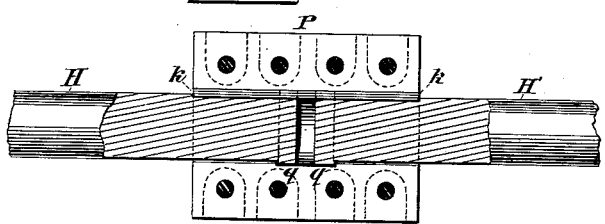
Figure 9:
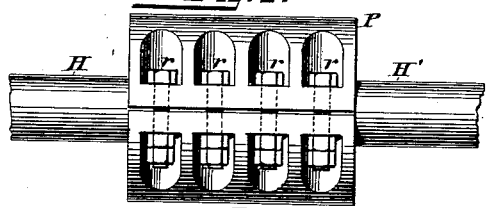

Figure 1 represents an exterior front view, showing also the drive-pulley connected with the pump; Fig. 2, the back or suction end view showing the flange around the inlet for attaching the suction-pipe to the pump, and showing also a side view of the discharge-pipe and a side view of the man-hole for entering the interior of the pump, and showing the method of attaching the back head of the pump to the supporting-base and the head of the hub of the wheel within; Fig. 3, a vertical cross-section on the line $y\ y$ of Fig. 4, showing the attachment of the horizontal shell of the pump to the supporting-base; Fig. 4, a vertical longitudinal section on the line $x\ x$ of Fig. 2, showing the principal and most parts of the pump; Fig. 5, a perspective view of one of the self-detachable blades of the wings proper of the pump; Fig. 6, a detailed longitudinal section on the line $x\ x$ of Fig. 2, showing the method and means of longitudinally holding the shaft against the suction-pull on the pump and longitudinally adjusting the wheel thereof; Fig. 7, a side view of the coupling which unites the pump-shaft to the pulley or driving shaft, a part of which coupling is split and the other part solid; Fig. 8, a vertical longitudinal section of a modified form of the shaft-coupling, it being split and consisting of but two pieces or halves, the joining face of one half being shown in the figure, showing also the side view of the key between the coupling and shaft; Fig. 9, an external view of the modified form of the shaft-coupling, showing the method of bolting the two halves together on the shafts; and Fig. 10, a view of a continous shaft, showing a split collar as part of the means, as will be shown, of longitudinally holding and adjusting the wheel of the pump.

Similar letters refer to similar parts throughout the several views.

The several parts of the outer casing or shell of the pump are designated in the drawings as follows:

A A is the base upon which the pump is mounted; B B, the cylindrical portion of the pump, about one-third of which deviates from the cylindrical shape and takes the form of a spiral, (shown by B' B', Fig. 2,) the termination of the spiral portion being the outlet of the pump; C C, the back head; C', the inlet; D D, the front head; D' D', a flanged projection cast with and being a part of the front head; E, the outlet; F, the man-hole; $f$, the man-hole plate; and $f'\ f'$ bolts that fasten said plate.

$c\ c\ c$ are lugs on the cylinder and heads of the pump, and $c'\ c'\ c'$ lug-bolts for fastening the heads to the cylinder.

$d\ d$, Fig. 4, are counterbores in the cylinder of the pump, both heads being of the same diameter and to correspond with said counterbores alike, whereby either end of the cylinder fits either head and admits of the cylinder being shifted around vertically and horizontally between the two heads by removing the lug-bolts $c'\ c'\ c'$; $d'$, an aperture in the cylinder B B for exhausting the air from the pump for charging the same; $d''\ d''$, shackles for the convenient handling of the heads; $a\ a\ a\ a$, a frame-work or stanchions extending down from and being a part of the same casting with the heads of the pump, by means of which the heads of the pump are independently secured to the base-plate by the bolts $a'\ a'\ a'$.

To protect the more costly heads from being rapidly worn out by the cutting action of the sand, gravel, and other materials to be pumped, we provide inner head-facings to protect them, which cost far less than the heads themselves, and which are far more conveniently replaced when worn out, and which save much time and expense in keeping the pump in repair. We further utilize one of these head-facings—the one adjacent to the front head—by enlarging it at the center and providing therein the principal bearing of the pump-shaft, which bearing is also subject to rapid wear and frequent need of renewing. By thus utilizing this head-facing for this bearing we still further prevent the destruction of the more costly front head, as when the said head-facing requires to be removed this principal shaft-bearing is also removed without being obliged to do anything to the front head itself, which by our own extensive experience in the use of our pump we have found to be a great saving and convenience. This head-facing of the front head is designated by G″ G″, it being a circular disk casting, covering the entire inner surface of the front head, and is secured thereto by the tap-bolts g″ g,″ Fig. 4, the central portion of this front-head facing having a projection G‴ G‴, extending well into the pump-chamber toward the back head and within the winged hub k′ k′ of the wheel of the pump to afford the support and bearing of that end of the pump-shaft which is submitted to the severest strain and greatest wear—namely, the wheel end bearing of the said shaft. We have also found by experience that that portion of the back head from the inner end of the inlet to the cylinder of the pump is rapidly cut away by work performed on sand and gravel. Therefore we employ an inner head-facing for this portion of the back head, (designated in Fig. 4 by G′ G′,) which is an annular disk or ring plate casting extending from the inner edge of the funnel-shaped inlet to the cylinder of the pump and secured to the back head by the tap-bolts g′ g′. We also show in the same figure a lining of the funnel-shaped inlet, held in place by the bolts g g; but this is not important, as by experience we find the inlet-funnel is not much worn by use.

The several parts of the wheel of the pump, together with its shaft and shaft-bearings and our peculiar device for longitudinally holding the pump-shaft and longitudinally adjusting the wheel, are designated in the drawings as follows:

H H is the pump-shaft, on which, by being keyed thereto, is mounted the wheel of the pump, and which at the outer end is coupled with the power-shaft H′, on which is mounted the driving-pulley J; k′ k′, a conical hub keyed upon the wheel end of the pump-shaft; M M, the wings of the wheel, which project radially out from and are cast with the said conical hub. This hub at the head end of the pump extends out into a circular disk to within a clearing distance of the inner surface of the cylinder thereof, and which we will term the "front-head wheel-disk," to which are attached and cast with it the front edge of the wings M M.

L′ L′ are the back-head wheel-disk, which is annular in form, the inner edge of which surrounds the larger or inner end of the funnel-shaped inlet C and extends therefrom to within a clearing distance of the inner surface of the cylinder of the pump. Upon the inner face of the said two disks are lugs or lug-ribs n″ n″, for attaching certain blades hereinafter described. This conical hub k′ k′, wings M M, front-head wheel-disk L L, and annular back-head wheel-disk L′ L′ are all rigidly united and consist of one piece or casting. These wings M M do not extend at the central portion of the wheel all the way from the front-head wheel-disk to the same plane of the annular back-head wheel-disk, but are cut away opposite to the inlet, about half-way from the back to the front head of the pump, Fig. 4, to facilitate the ingress of the materials to be pumped. Neither do these wings M M, as cast with the hub and the said two wheel-disks, extend radially to within a clearing distance of the cylinder of the pump, as do the said two wheel-disks L L and L′ L′, but only about two-thirds of the distance from the diameter of the said hub to the said cylinder. There is an important reason for not extending these wings to the full diameter of the pump in casting the wheel as above described, and why we employ other means for extending and completing these wings to the cylinder.

To complete the above-described wings, we employ what we term "breakable self-detachable blades" N N, Fig. 4, one of which is shown in perspective by Fig. 5, which are made of thin easily yielding or bending or breakable sheet metal, and which are attached to the inward-projecting lugs or ribs n″ n″ on the front and back head wheel-disks L L and L′ L′, and attached thereto in such a peculiar manner that the said blades, when acted upon by any unusual violence or force resulting from any extraordinary obstruction passing through the pump, they (the said breakable blades) will be bent or broken and self-detached from their fastening and from the wheel without damaging any other part of the wheel or pump, and thereby save the cost and delay which would result from breaking any part of the costly casting consisting of the hub k′ k′, disks L L and L′ L′ and wings M M. The method we employ for attaching these breakable self-detachable blades N N consists in fastening them at each end to the inward-projecting lugs or ribs n″ n″ on the said two wheel-disks with small lug-bolts n′ n′, and having slots n n (see Fig. 5) cut from the bolt-hole to the extremity of the blades, in width something more than equal to the diameter of their fastening-bolts, so that when the said breakable blades are acted upon by any extra violence they will be bent or broken, and, being thus bent, will be longitudinally shortened, and the ends thereby pulled out from under the heads of their fastening-bolts n′ n′, and thus become self-detached from the wheel, and thereby obviating more serious damage to said wheel and other parts of the pump. These breakable self-detachable blades are inexpensive and can be kept in reserve, and are easily, inexpensively, and quickly replaced, while on the other hand, if the cast wings M M were to extend to the full diameter of the said wheel-disks and one or more of them should be broken, the cost of repair and the delay necessary of an expensive plant would be very great. In deepening the channels of New York harbor, for instance, we have found by extensive experience that such obstructions as cannon-balls, lumps of iron, fragments of anchor-chain, stones, &c., being heavier than water, sand, and gravel, are by centrifugal force always thrown to the outer ends of the wings of the pump, often carrying away all these self-detachable blades without causing the least damage to any other part of the wheel or pump, which, together with having quick and convenient access to the interior of the pump through and by means of the man-hole F, we are enabled to replace, and thus repair the damage and set the plant to work again in a few minutes.

The wheel as above described (consisting of the hub $k\ k$, wings M M, wheel-disks L L and L' L') without the breakable self-detachable blades N N is effective, (but of course not as effective as with them;) and we often pump hundreds of cubic yards of sand, &c., without the said blades, to complete the loading of ships and scows before stopping to put the said blades on when they have been broken away and detached by some obstruction, as a cannon-ball or fragment of anchor or anchor-chain, &c.

It is evident that there is always a powerful longitudinal draft or force exerted upon the wheel and its shaft by and in the direction of the suction into the pump of the materials pumped, and that consequently there is always a side wear and displacement of the wheel in only one longitudinal direction, and that toward the inlet.

The method heretofore employed to hold the wheel and its shaft against displacement by the suction of the pump has not been by obtaining, as we do, an unyielding counter-resistance to the suction force from or upon head (front head) of the pump, but rather by obtaining such counter-resistance from the driving-shaft or some other source than the head of the pump. Therefore, to provide against this one-sided wear and longitudinal displacement of the wheel and shaft and to readjust the same, as from time to time it may be required, and so entirely overcome this difficulty connected with the action of centrifugal pumps, we employ the following means:

O O is a circular yoke fastened by the collar-bolts $o\ o$ to the flange D' D' of the central projection (provided for this purpose) on the front head of the pump. The bearing of the pump end of the pump-shaft is, as before stated, in the hub of the front facing G''' G''', and the outer bearing of the said shaft is in the outer end of the said projection D' D' on the front head D D. The bearing-box S (best seen in Fig. 4) of the pump end of the shaft is held from turning by the screw-pins $j\ j$. The bearing-box S' S' of the outer bearing of the pump-shaft performs a two-fold function—viz., that of a bearing-box and a stuffing-box, the latter function to exclude or prevent the air from entering into the pump-chamber through the front head. (Shown as removed in Fig. 4 and as in working position in Fig. 6.)

Having thus shown how the pump-shaft is provided with bearings and bearing-boxes for its vertical and lateral support, we now proceed to show how we provide for supporting the said shaft and the wheel from longitudinal displacement by the force of the suction on the wheel, and how (when required) we longitudinally readjust the wheel by obtaining an unyielding adjustable resistance to such longitudinal strain.

Surrounding the pump-shaft (see Fig. 6) where it passes through the circular yoke O O we provide an externally-threaded tube or sleeve T T, which, by a corresponding thread therein, is screwed into the said circular yoke O O. Upon the pump end of this threaded tube or sleeve is provided a nut $m'\ m'$, to act as a jam-nut against the pump side of the said yoke. Upon the other or outer end of the said tube or sleeve T T is provided as a part of the same a heavy flange $m\ m$. Around the shaft and next to the outer face of the said flange $m\ m$ are placed one or more, preferably two or three, loose smooth-faced washers $i\ i$. Adjacent to and outside of these washers comes the shaft-coupling P P, which unites the pump-shaft to that of the driving-pulley. The pump end of this coupling is faced to smoothly work against the said washers $i\ i$. The said tube or sleeve T T does not come in contact with the pump-shaft at all, there being an open space between it and the said shaft, and therefore it (the said sleeve) does not in any manner act as a vertical or lateral bearing or support for the pump-shaft.

It will be seen that any strain or force longitudinally acting on the pump-shaft in the direction of the pump, as there always is by the suction thereof, will, through the medium of the pump-shaft, first fall on or be applied to the pump end of the said shaft-coupling P P, which of course is immovably attached to the said pump-shaft, and then on the loose washers $i\ i$, then on the flange $m\ m$ of the said sleeve T T, then on the circular yoke O O, then on the collar-bolts $o\ o$, and then on the front head of the pump, which is an unyielding resistance to the suction force of the pump. If in time by ordinary wear it becomes, as it often does, necessary to readjust the longitudinal position of the wheel within its chamber by moving it toward the front head, such readjustment is quickly, conveniently, and effectually performed simply by slacking the said jam-nut $m'\,m'$ and turning back the said sleeve T T in the circular yoke O O as far as the wheel of the pump requires to be moved, and then tightening up the said jam-nut $m'$. (See Fig. 6.)

The shaft-coupling, Fig. 6, consists of two parts P P and R R, provided with flanges which are bolted together by bolts $r'\,r'$, Fig. 7, the part P P, which attaches to the pump-shaft, being bifurcated, and the two halves thereof being fastened to the said shaft by the clamp-bolt $p\,p$, and the part R R, which attaches to the driving-shaft, being in one piece, and both parts keyed to their respective shafts by their respective keys $k$, and the part P P being countersunk into a recess in the pump-shaft to securely hold it from longitudinally moving thereon, to better afford a secure resistance to the sleeve T T and to the longitudinal movement of the wheel within the chamber of the pump.

Figs. 8 and 9 represent a modification of the shaft-coupling, in which only two, instead of three, pieces are employed, (which is one bifurcated coupling, embracing both the pump and driving-shafts,) and are clamped together and thereon by the bolts $r\,r\,r$, and which said coupling is keyed to both said shafts by one common key $k$.

Figure 10:
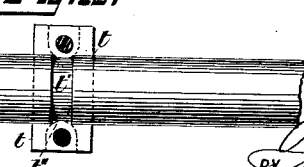

Fig. 10 represents our method of employing in the small-sized pumps a continuous shaft. On such a shaft we employ a bifurcated collar $t\,t$, having a circular rib $t''$, centrally projecting from its inner face, which falls into a corresponding groove $t'$, formed in and around the shaft. This collar is tightly clamped to the said continuous shaft, its function being to furnish on the shaft a shoulder or face for the flange $m\,m$ of the adjustable sleeve T T, and which in this respect serves the same purpose as the coupling in Figs. 6 and 7.

The materials pumped, often consisting of sharp cutting sand, rapidly cut and wear out the main bearing-box S and the pump-shaft working therein. To avoid this rapid destruction of these parts it becomes necessary to exclude the sand and such like material therefrom. For this purpose, and not for the purpose of making the pump air or water tight or for any other purpose besides the one above given, we surround the said bearing-box at the nearest practicable point thereto with a rubber or wooden sand-ring U U, (seen in Fig. 4,) placed between the front-head wheel-disk L L and the front-head facing-disk G'' G'' just outside and around the hub of the latter disk, the said ring being let into a dovetailed groove in either one of the said two disks and acting upon or rubbing sand-tight upon the other, it being immaterial as to which of the said two disks it be fastened. This sand-ring is in no sense used as a pump-packing as usually employed for making the pump water-tight, but is employed as a sand-arrester to protect the exposed bearing-box S from rapid destruction. This sand-ring acts in conjunction with the device before described for longitudinally adjusting the wheel, whereby by means of the said device the said ring is adjusted to and made to bear upon the wheel-disk L L with any desired pressure which may be required to arrest the sand, so that the said sand-ring becomes also adjustable when considered in combination (which it strictly is) with the device for longitudinally adjusting the wheel.

It will be seen that the cylinder of the pump is so counterbored—that is, the two ends being counterbored alike and the two heads (back and front) being of the same diameter, either of them will fit either end of the cylinder of the pump. Therefore by detaching the heads therefrom and horizontally turning the cylinder around the pump is converted from a left to a right hand pump, and vice versa, simply by putting in a corresponding wheel. It will be seen, too, that by detaching the heads from the cylinder (without detaching them from their base) simply by removing the lug-bolts $c'\,c'\,c'$ the cylinder can be vertically shifted or turned, so as to discharge in a horizontal or vertical direction, or at any angle between these directions, as may be desired.

Through the cylinder of the pump we provide a man-hole F, Fig. 3, closed with a suitable plate-cover $f$, secured with bolts $f'\,f'$, for the purpose of examining and repairing the wheel of the pump, thus obviating the necessity of removing the heads, or either of them, to make repairs of the wheel, especially when only the breakable self-detachable blades N N are required to be renewed. The cover, as shown in Fig. 3, projects into the man-hole and its inner face is so formed as to conform to and complete that portion of the spiral part of the cylinder of the pump-chamber which is cut away in providing the man-hole.

Having thus described the various parts of our pump and pointed out the several functions which they respectively perform, it may here be stated that our improvements and invention relate more particularly to the following features: the construction of the wheel, the construction of the chamber, the mounting of the heads or the base independently of the cylinder, the front and back head face-plates to protect the heads, the wheel-end bearing of the pump-shaft, it being in the front-head facing instead of in the front head itself, the man-hole in the cylindrical part of the pump, the sand-ring to protect the main bearing from sand, and provision for longitudinally holding and adjusting the wheel and its shaft against the suction of the pump.

We are aware of patents issued to R. W. and J. H. Schmidt July 21, 1847, No. 5,203, to Charles J. Ball February 1, 1881, No. 237,151, and to J. G. and P. E. Falcon August 3, 1886, No. 346,471, relating to false and yielding wings in centrifugal pumps; Therefore we do not claim, broadly, false or yielding wings irrespective of the manner of arranging them and the special purpose for which they are employed.

We are also aware of the patent issued to W. O. Webber March 2, 1886, No. 337,216, in which he provides for vertically rotating the casing of his pump to change the position of the suction and discharge openings. Therefore we do not claim, broadly, the means of changing the position of these openings in centrifugal pumps irrespective of the manner of accomplishing this result.

We are also aware that packing-rings have been employed in centrifugal pumps—as shown, for instance, in patent granted to F. T. Adams December 6, 1887, No. 374,331. Therefore we do not broadly claim packing-rings in such pumps.

What we claim as new and useful, and desire to secure by Letters Patent, is—

1. In a centrifugal pump, a wheel having in one piece the hub $k'$ $k'$, the front-head disk L L, extending to the full diameter of the pump, with lug-ribs $n''$ $n''$, the annular back-head disk L' L', extending from the funnel C, with lug-ribs $n''$ $n''$, the wings M M, extending from said hub and radially terminated at about two-thirds of the distance from the center of the wheel to the periphery of the said front and back wheel disks, and the detachable blades N, attached to the lug-ribs $n''$ $n''$, substantially in the manner and for the purposes described.

2. In a centrifugal pump, in combination with the wheel thereof, the breakable self-detachable blades N N, having the slots $n$ $n$ extending from their fastening-bolts $n'$ $n'$ to the end of the said blades, and the fastening-bolts $n'$ $n'$, whereby the said blades, when longitudinally bent or transversely broken by obstructions, will slip out from under the heads of their said fastening-bolts and become thereby self-detached from the wheel of the pump, as and for the purpose set forth.

3. In a centrifugal pump, a wheel having in one piece the hub $k'$ $k'$, the front-head disk L L, extending to the full diameter of the pump, with lug-ribs $n''$ $n''$, the annular back-head disk L' L', extending from the funnel C, with lug-ribs $n''$ $n'''$, and the wings M M, extending from said hub and radially terminated at about two-thirds of the distance from the center of the said hub to the periphery of the said front and back head disks, in combination with the breakable self-detachable blades N N, having the slots $n$ $n$ extending from their fastening-bolts $n'$ $n'$ to the end of the said blades, substantially as and for the purpose specified.

4. In a centrifugal pump, the combination, with the wheel and casing thereof, of the front head D D, and shaft H H, the removable front-head face-plate G'' G'', securely fastened to the said head, and having the shaft-bearing hub G''' G''', substantially as and for the purposes specified.

5. In a centrifugal pump, the sand-ring U U, surrounding the hub G''' G''', having one side thereof secured to the front-head face-plate G'' G'' and the other side bearing on the front wheel-disk L L, in combination with the wheel-adjusting parts, consisting of the circular yoke O O, the adjustable sleeve T T, stud-bolts $o$ $o$, front head D D, and shaft-coupling P P, whereby the said sand-ring can be kept adjusted to the front wheel-disk with only the needed pressure to arrest the sand without causing superfluous friction.

6. In a centrifugal pump, the circular yoke O O, having the adjustable sleeve T T and stud-bolts $o$ $o$, in combination with the front head D D and shaft-coupling P P, whereby by adjusting the said sleeve in the said yoke the wheel of the pump is longitudinally adjusted and centrally held against the force of its suction within its chamber, substantially as specified.

JOSEPH EDWARDS.
JAMES R. F. KELLY.

Witnesses:
W. E. CASHMAN,
LAWRENCE C. FISH.